Jan. 26, 1965  G. R. STEGEN  3,166,900
METHOD AND APPARATUS FOR FLUID FLOW CONTROL
IN TWO PHASE AERATION SYSTEMS
Filed Feb. 1, 1963  2 Sheets-Sheet 1
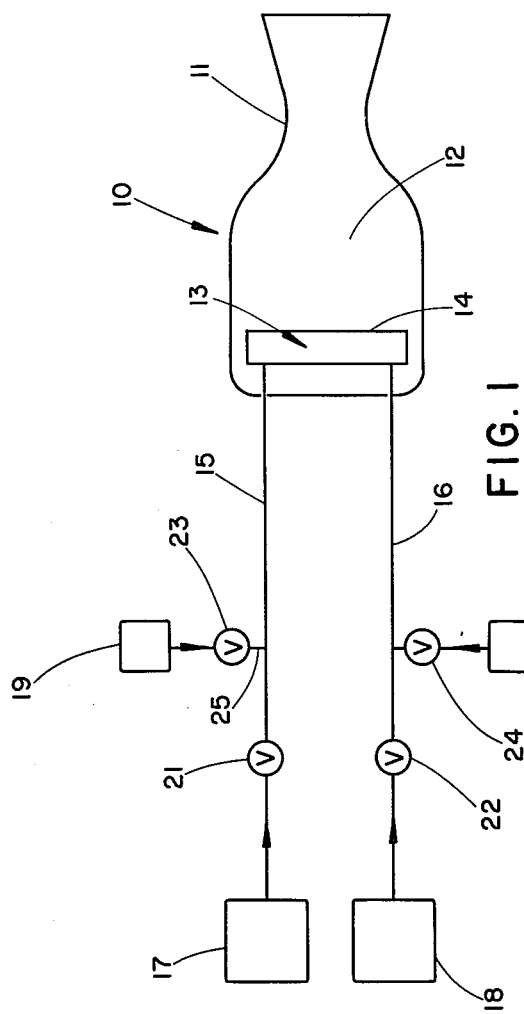
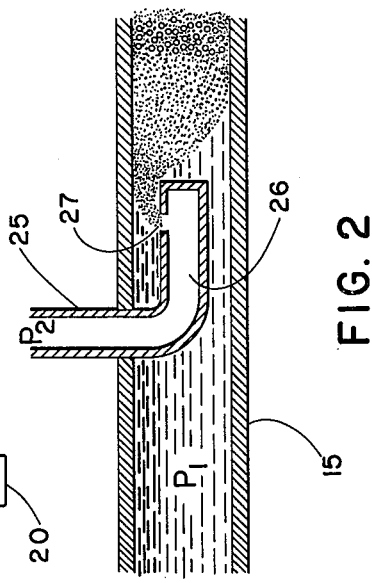
INVENTOR.
Gilbert R. Stegen

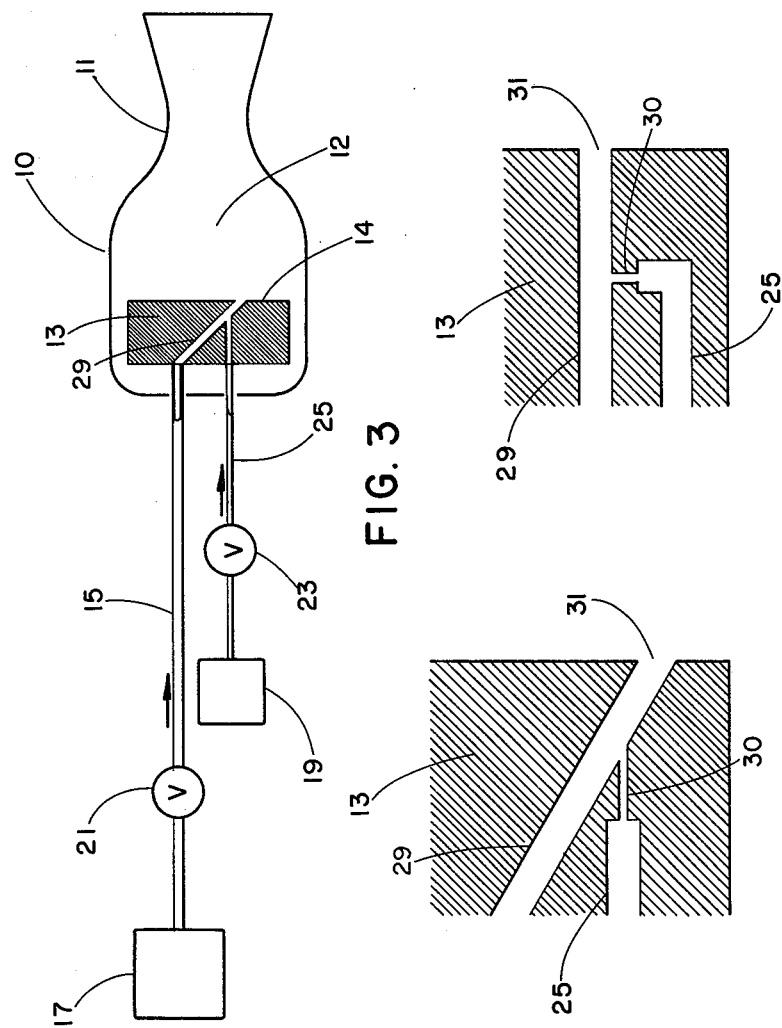

United States Patent Office 3,166,900
Patented Jan. 26, 1965

3,166,900
METHOD AND APPARATUS FOR FLUID FLOW CONTROL IN TWO PHASE AERATION SYSTEMS
Gilbert R. Stegen, Mountain View, Calif., assignor to United Aircraft Corporation, East Hartford, Conn., a corporation of Delaware
Filed Feb. 1, 1963, Ser. No. 255,503
1 Claim. (Cl. 60—35.6)

The present invention relates to an improvement in aeration of liquid propellants for the purpose of thrust modulation and more particularly to an improved system and structure for decoupling the gas feed line from the propellant feed line in order to substantially mitigate unstable flow conditions.

In the control of vehicles employing reaction motor systems, throttling the rate of propellant consumption for thrust modulation plays a significant role. Because of inherent disadvantages involved in modulating the thrust of liquid reaction motors by line-throttling the liquid propellant feed lines or using variable area orifices in the propellant injector, it has recently been proposed to vary the thrust output by modifying propellant density. For example, Morrell in Patent No. 3,045,424 proposes injecting inert gases into propellants to decrease the density thereof and, in turn, reduce the thrust output of the reaction motor. However, attempts at producing an aerated propellant which will flow smoothly to the propellant injector face over a wide range of densities have been unsuccessful by virtue of surging and pressure oscillations of the aerated flow. As a result, the quantities of gas consumed have been excessive, the useable range of a specific system has been quite limited, and localized over-heating has been experienced in the injector head.

It is the general purpose of this invention to provide an improved system for effectively mitigating the tendency of aeration systems towards surging and developing severe pressure oscillations which result in the aforementioned difficulties. This improvement in propellant aeration is effected by providing a sufficient pressure drop across the gas flow orifice at the point of injection into the liquid propellant whereby gas injection is at sonic velocities. It has been found that by so doing the resultant mixture-flow is maintained free of any severe pressure oscillations.

An object, therefore, of the present invention is to provide an aeration system which greatly extends the useable range of the propellant injector.

Another object is to provide a propellant aeration system which effectively mitigates unstable flow conditions in the fluid feed lines.

A further object is the provision of a propellant aeration system which successfully mitigates chugging or surging of aerated propellant.

It is another object to provide a propellant aeration system wherein the aerated flow does not surge upstream of the point of gas injection.

A still further object is the provision of a propellant aeration system which minimizes flow separation and the formation of distinct gas pockets which tend to lead to severe overheating of the injector.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

FIG. 1 illustrates a typical prior art aeration system.

FIG. 2 illustrates a sonic orifice of the present invention used in a propellant feed line.

FIG. 3 illustrates the use of a sonic orifice employing gas injection into a propellant in proximity to the port of an injector.

FIG. 4 shows a preferred embodiment of the present system employing a sonic orifice in the injector head.

FIG. 5 illustrates an alternative structural arrangement of the propellant and gas feed lines in an injector head.

Referring now to the drawings and more particularly to FIG. 1, a gas aeration system of the prior art is shown comprising a conventional rocket engine thrust chamber 10, an injector 13, propellant feed lines 15 and 16, propellant storage tanks 17 and 18, and aeration medium tanks 19 and 20. By opening valves 21 and 22, the propellants are caused to flow into the injector 13 where they are injected into the combustion chamber 12 for ignition and exhaust through nozzle 11. In order to reduce the thrust output of the reaction engine, this system calls for opening valve 23 and 24 to inject into the propellants in lines 15 and 16 a predetermined quantity of density-modifying gases contained in tanks 19 and 20. In this way, the thrust level of the reaction engine is reduced even though the injection-velocity is maintained substantially constant. The injection of the gases from tanks 19 and 20 into the propellant cuts down on the rate of system propellant consumption and, consequently, the power output thereof. However, in such a system, surging of the aerated flow was experienced. This surging is believed to result from the collapse of the two-phase mixture of gas and propellant in a cyclic manner and from the dynamic instability brought about by the coupling of the gas, liquid, and two-phase mixture at the point of injection.

This instability, brought about by the fluid coupling, is substantially abrogated by employing at the end of gas feed line 25 an injector 26 having therein a sonic orifice as shown in FIG. 2. It has been found that by using at least one sonic orifice 27 to inject the gases into the propellant flowing through feed line 15 the undersirable coupling between the three fluids, namely, the gas, the propellant, and the two-phase mixture, is substantially eliminated. As a consequence, the surging effects caused by dynamic instability brought on by the coupling of the beforementioned fluids is markedly reduced. In order to effect the necessary sonic velocity of the gas in orifice 27 or a multiplicity of orifices, it is necessary to maintain in gas feed line 25 a pressure $P_2$ which is approximately twice that of the propellant pressure $P_1$ found in line 15. As is well known in the art, sonic flow results when the pressure ratio between the working fluid and the medium into which the fluid is injected is a ratio of approximately two to one.

As pointed out in co-pending application Serial No. 255,516 filed on February 1, 1963 entitled "Improved Method and Manufacture for Propellant Aeration" by Duane W. Lundahl, the separation of aeration gas from the propellant into distinct pockets is substantially reduced by injecting the gas at a point in proximity to the injector face. Such a system is shown in FIG. 3 wherein the gas feed line 25 opens into the propellant feed line 15 at a point relatively close to the injector face 14. In order to incorporate the teachings of the present invention in such a system, the gas feeder line 25 is provided with an orifice 30 which opens into the propellant feed line 29 at a point downstream of the injection port 31 as shown in FIG. 4. In this way oscillations and surging within the fluid feed system is substantially mitigated and stable flow results. This facilitates injecting an aerated propellant in a homogeneous form at a constant rate into the combustion chamber involved.

Although FIG. 4 shows as a preferred embodiment the introduction of the aerating gas at an acute angle to the propellant stream, an alternative approach is to inject the gas normally to the propellant stream as shown in FIG. 5. It is possible to vary this angle to any degree desired in order to achieve the desired decoupling effect of the present invention.

It is apparent that the above described system may be employed in any reaction motor system employing propellant feed lines. For example, where aeration is employed in hybrid reaction motors or in mono-propellant systems, the instant invention is equally applicable. Consequently, in any system where a liquid propellant is aerated with a density-modifying medium comprised of a gas, the instant invention may be employed to substantial advantage in order to effect stable flow under dynamic conditions. For example, the improvement of the present invention may be used for aeration systems such as those described in Serial No. 255,457 filed on February 1, 1963 entitled "Method for Aeration of Liquid Propellants" by Daniel S. Goalwin and in Serial No. 255,459 filed on February 1, 1963 entitled "Thrust Modulation" by Herbert W. Hoeptner.

Obviously, many modifications and variations of the present invention are possible in light of the above teachings. The structural systems described for carrying out the present invention are merely exemplary and many alternative structures may be employed for practice of the instant invention. It is, therefore, to be understood that within the scope of the appended claim the invention may be practiced otherwise than as specifically described.

Having thus described the invention, what is claimed is:

In a method for modulating the thrust level of a thrust generator which method comprises injecting a gas into a propellant to reduce the bulk density of said propellant and subsequently using said propellant of modified bulk density to power said thrust generator, the improvement comprising injecting the gas at at least sonic velocity into the propellant whereby the homogeneity of the propellant of modified bulk density is substantially improved and dynamic instability of the thrust generator substantially abated.

References Cited by the Examiner
UNITED STATES PATENTS 3,045,424  7/62  Morrell _____ 60—35.6 X

OTHER REFERENCES

Rocket Encyclopedia Illustrated, Aero Publishers, Inc., 1959, page 118.

SAMUEL LEVINE, *Primary Examiner.*
ABRAM BLUM, *Examiner.*